United States Patent [19]
Kvifte et al.

[11] Patent Number: 5,337,297
[45] Date of Patent: Aug. 9, 1994

[54] MAGAZINE DRAWER MANIPULATION SYSTEM FOR A DATA CARRIER LOADER

[75] Inventors: Halvor O. Kvifte, Haslum; Guttorm Rudi, Fjellhamar, both of Norway

[73] Assignee: Tandberg Data Storage A/S, Oslo, Norway

[21] Appl. No.: 56,756

[22] Filed: May 4, 1993

[51] Int. Cl.$^5$ ............................................. G11B 15/68
[52] U.S. Cl. ............................................. 369/36; 360/92
[58] Field of Search ................ 360/92, 98.04, 98.06; 369/34, 36, 38; 414/267, 274, 277, 281, 282, 416

[56] References Cited

U.S. PATENT DOCUMENTS

| | | |
|---|---|---|
| 3,222,449 | 12/1965 | Garwin et al. |
| 3,431,367 | 6/1985 | Nickl |
| 3,848,264 | 11/1974 | Wilson ............................ 360/92 |
| 4,580,254 | 4/1986 | Hojyo et al. ...................... 369/34 |
| 4,644,425 | 2/1987 | Tamaki |
| 4,802,035 | 1/1989 | Ohtsuka |
| 4,835,634 | 5/1989 | Ostwald |
| 4,856,956 | 8/1989 | Zur ................................. 414/281 |
| 4,911,506 | 3/1990 | Stefan |
| 4,918,548 | 4/1990 | O'Donnell et al. ................ 360/92 |
| 5,021,902 | 6/1991 | Ishikawa et al. .................. 360/92 |
| 5,045,958 | 9/1991 | Leonard et al. ................... 369/38 |
| 5,050,020 | 9/1991 | Campbell et al. |
| 5,182,686 | 1/1993 | Lindenmeyer |
| 5,182,687 | 1/1993 | Campbell et al. |

FOREIGN PATENT DOCUMENTS

| | | | |
|---|---|---|---|
| 0119206 | 9/1979 | Japan .......................... | 360/92 |
| 0241166 | 10/1987 | Japan .......................... | 360/92 |
| 1-205755 | 8/1989 | Japan . | |
| 1-296452 | 11/1989 | Japan . | |
| 2-96965 | 4/1990 | Japan . | |

*Primary Examiner*—A. J. Heinz
*Assistant Examiner*—Brian E. Miller
*Attorney, Agent, or Firm*—Hill, Steadman & Simpson

[57] ABSTRACT

A loader data carriers, such as magnetic tape cartridges, of the type having a housing with a data reader therein which is movable over a magazine containing a number of data carriers, so as to be positionable above a selected data carrier for transfer between the magazine and the data reader, has a drawer which carries the magazine and which is slidable into and out of the loader housing. A drive motor is contained in the housing for moving the data reader over the drawer, and the reader carries transfer assemblies, such as roller-driven belts, to effect the transfer of the data carriers between the magazine and the reader. The drawer has engagement elements mounted thereon which can engage the transfer assemblies, so that the same motor which is used to move the data reader over the drawer can be used to slide the drawer into and out of the loader housing, when the transfer assemblies are engaged with the engagement elements. The loader housing may be formed by a single extruded tube, with interior glide elements thereon on which the data reader and the drawer are respectively movably mounted by roller assemblies.

11 Claims, 4 Drawing Sheets

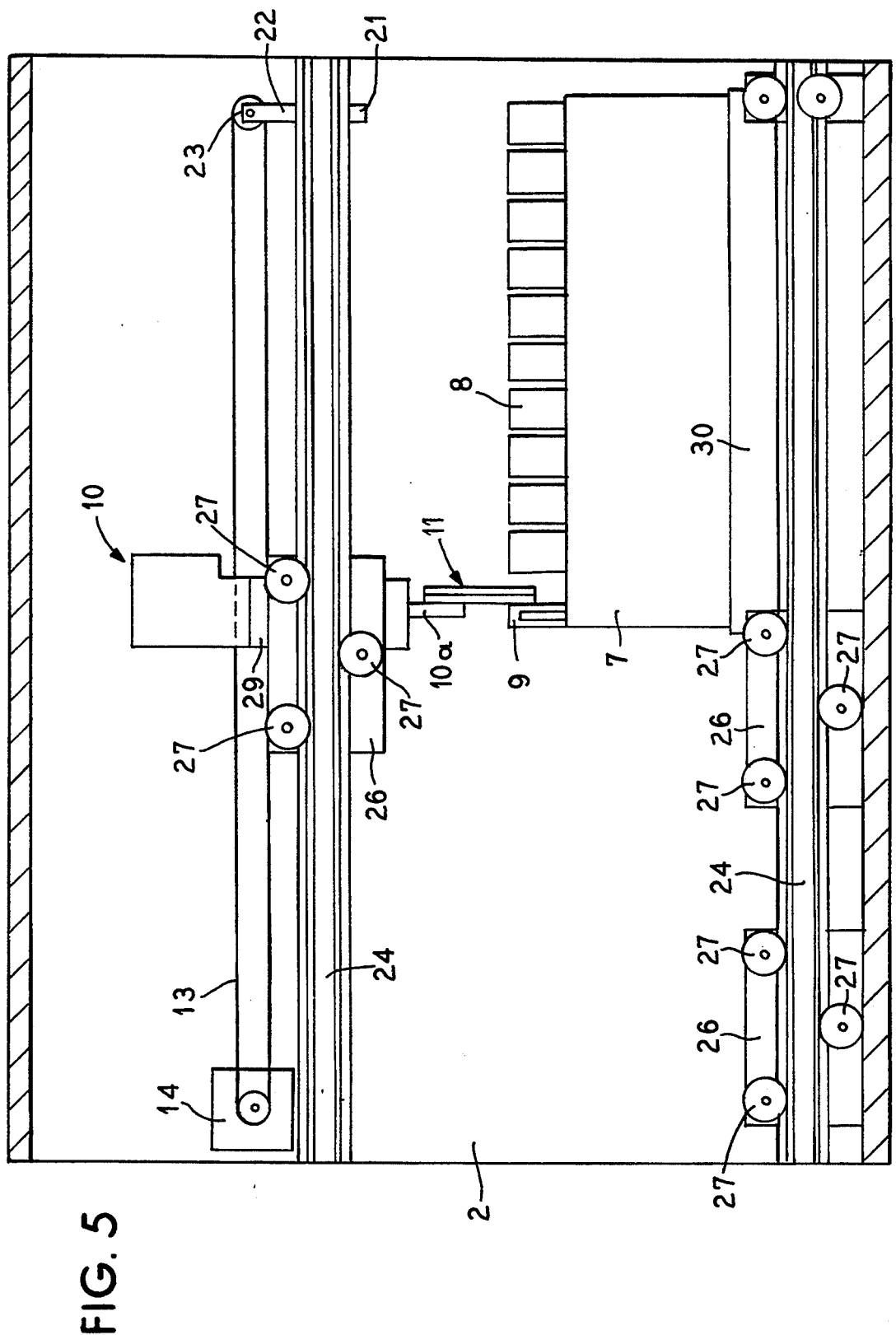

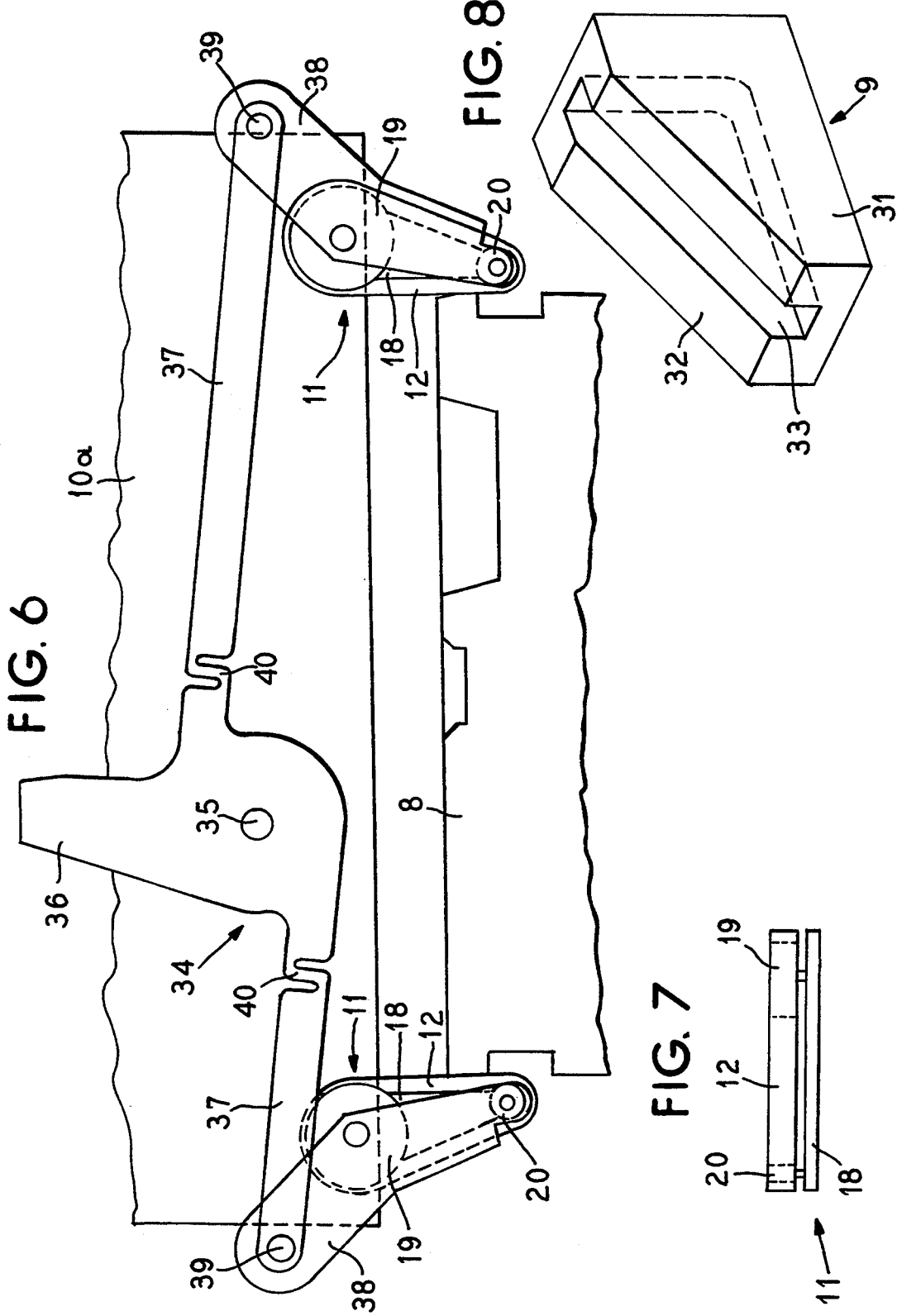

MAGAZINE DRAWER MANIPULATION SYSTEM FOR A DATA CARRIER LOADER

BACKGROUND OF THE INVENTION

1. Field of the Invention

The present invention is directed to loaders for data carriers, and in particular to a loader of the type wherein a magazine containing a plurality of data carriers is inserted into a loader housing, and a data reader is moved over the magazine to select a data carrier therefrom for insertion into the reader.

2. Description of the Prior Art

It is known to record and store data on a number of different types of storage media, such as magnetic tape, optical disks and the like. Because of the limited size of such data carriers, the amount of data which can be stored thereon is similarly limited. In computing and data retrieval systems wherein a large amount of data is stored, a relatively large number of such data carriers are required in order to contain all of the necessary data. To retrieve the data from the data carrier, it is necessary to insert the carrier into a data reader, such as a tape drive unit. (As used herein, the unit into which the data carrier is inserted will be referred to as a "reader," although it may also be used for the purpose of writing data on the carrier.)

In systems requiring multiple data carriers, it is cumbersome to manually successively insert and remove the data carriers from the reader. Many such systems, therefore, employ a data carrier magazine, which holds a large number of data carriers, with the magazine being loadable into a device which contains the reader. A selected data carrier can then be automatically removed from the magazine, and automatically inserted into the reader wherein the data on the carrier is read, or new data is written on the carrier. After completion of the read or write operation, the data carrier is then automatically removed from the reader and is replaced in the magazine. The overall unit, which includes the magazine, the data reader, and an automated mechanism for removing the data carrier from the magazine, inserting it into the reader, and removing it from the reader and replacing it in the magazine, is generically known as a "loader." Loaders can generally be classified into three types: Those in which the magazine is stationary in the loader and the drive is moved over the magazine to the position of a selected data carrier in the magazine, those wherein the reader is stationary and the magazine is moved to position a selected data carrier at a location for insertion in the reader, and those wherein both the magazine and reader are stationary, and an "elevator" or other type of data carrier transfer mechanism is used to move the selected data carrier from the magazine, transport it to, and insert it in the reader. Various combinations of these three basic types of units are also known.

A loader of the first type, wherein a plurality of data carriers, such as magnetic tape cartridges, are contained in a stationary magazine, and a tape drive unit is moved over the magazine to a position above a selected tape cartridge, is described in Japanese Patent 2-96965. In this known device, transfer of the tape cartridge from the magazine into the reader takes place by means of a mechanism which is carried by the tape drive unit and which extends below the magazine. Each cartridge receptacle in the magazine has an opening in a bottom thereof, and the mechanism carried by the tape drive unit has a rotatable threaded rod connected to a lifting element which is disposed in registry with the opening for a receptacle when the tape drive unit is positioned above that receptacle. Rotation of the threaded rod causes the lifting element to project into the opening, thereby pushing the tape cartridge upwardly out of the magazine and into the tape drive unit, at least to a sufficient extent to permit mechanics within the tape drive unit to engage the tape cartridge.

Another type of transfer mechanism for cassettes is described in Japanese Patent 1-205755. That patent discloses a cassette insertion and removal mechanism for use in a video cassette lending machine, wherein the cassette is gripped on opposite sides by respective roller-driven belts. The belts frictionally engage the cassette, and when moved by respective driven rollers about which the belts are entrained, a cartridge is removed from a location on a storage shelf. The mechanism can be operated in reverse for replacing the cassette on the storage shelf.

SUMMARY OF THE INVENTION

It is an object of the present invention to provide a data carrier loader of the type wherein a data reader is moved in a housing over a stationary data carrier magazine, and wherein the magazine is introduced into the housing in a magazine drawer, wherein movement of the magazine drawer is automated without significantly adding to the overall complexity and cost of the loader.

It is a further object of the present invention to provide means for automatically moving the magazine drawer into and out of the loader housing without the use of a separate motor exclusively dedicated to the magazine drawer.

It is a further object of the present invention to provide means for moving the magazine drawer into an and out of the loader housing which cooperates with the roller driven belts which are used for transferring data carriers between the magazine and the data reader.

Another object of the present invention is to provide a housing for such a loader which further enhances the simplicity and cost savings which are achieved by the other objects.

The above objects are achieved in accordance with the principles of the present invention in a data carrier loader of the type having a drawer slidable into and out of a loader housing in a longitudinal direction, the drawer having a region adapted to removably hold a plurality of data carriers, and a data reader movably supported in the housing above the region of the drawer which carries transfer means thereon for transferring a data carrier between the drawer and the data reader, and wherein the drawer has engagement means mounted thereon for engaging the transfer means so that the same reader positioning drive, which is used to move the data reader over the drawer to a selected location above a data carrier, can also be used for automatically moving the drawer into and out of the housing.

The simplicity and cost savings of the above measure, which avoids the necessity of having a separate motor dedicated to the purpose of moving the magazine drawer into and out of the loader housing, are further enhanced in an embodiment of the invention wherein the portion of the housing forming the top, bottom and sidewalls thereof is a single extruded metallic tube. Glide elements disposed in the interior of the housing at the sides thereof, on which the data reader and the magazine drawer respectively move on roller assemblies, are generated as a part of this housing portion itself in the extrusion. The necessity of maintaining an inventory of separate parts for such guide elements, and fasteners therefor, is thereby avoided, as is the necessity of drilling holes in the housing walls for the fasteners at specified locations. The assembly steps of fastening the glides to the interior of the housing are also avoided.

DESCRIPTION OF THE DRAWINGS

FIG. 5 is a side sectional view of the loader shown in FIG. 4, taken along line V—V.

FIG. 6 is a plan view of one embodiment of a linkage for manipulating the data carrier transfer/drawer engaging assemblies.

FIG. 7 is a side elevational view of a data carrier transfer/drawer engaging assembly, constructed in accordance with the principles of the present invention.

FIG. 8 is a perspective view of one engagement element carried on the magazine drawer, constructed in accordance with the principles of the present invention.

DESCRIPTION OF THE PREFERRED EMBODIMENTS

Figure 1:
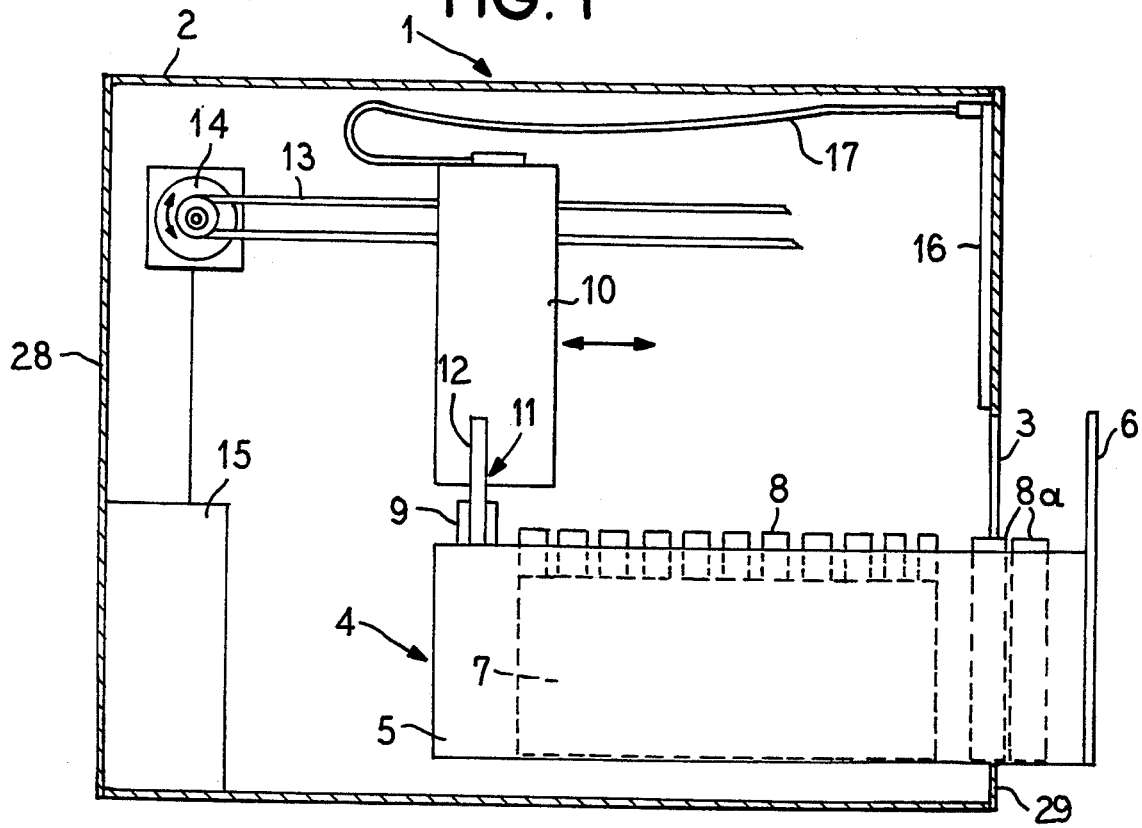
FIG. 1 is a side sectional view of a data carrier loader constructed in accordance with the principles of the present invention, with the interior components being schematically indicated.

A loader 1 constructed in accordance with the principles of the present invention is shown in sectional view in FIG. 1, with the components therein necessary for explaining the principles of the present invention being schematically indicated. The loader 1 has a housing formed by an extruded tube 2, which forms the top, bottom and sides of the housing, to which a rear panel 28 and a front panel 29 are attached. The front panel 29 has an opening 3 therein, for accommodating a drawer assembly 4. The drawer assembly 4 includes a drawer body 5, plus other elements described in more detail below. The drawer assembly 4 also has a drawer front 6 which, when the drawer assembly 4 is fully introduced into the loader 1, closes the opening 3. The drawer assembly 4 is movable into and out of the loader 1 in the direction of the double arrow shown in FIG. 1, i.e., along the longitudinal extent of the drawer assembly 4. The drawer assembly 4 is movable on supports and rollers in the housing 1, described in more detail below.

The drawer body 5 is adapted to receive a magazine 7 which contains a plurality of data carriers 8, such as magnetic tape cartridges. The data carriers 8 can be manually inserted into the magazine 7 at a location remote from the loader 1, at which a plurality of such loaded magazines 7 can be stored. A selected magazine is then placed in the drawer assembly 4 for insertion into the loader 1.

The drawer assembly 4 also includes space for accommodating separate data carriers 8a, which may remain in the drawer body 5 at all times, independently of the insertion and removal of the magazine 7. The data carriers 8a may, for example, be a cleaning cartridge and a "mail slot" cartridge. When a data carrier 8 is to be removed from the magazine 7 in the drawer body 5 for insertion into a data reader 10, the data reader 10 is moved along the direction of the double arrow by means of a belt 13 operated by a motor 14 connected to a power unit 15, until the reader 10 comes to be positioned above the selected data carrier 8. This is accomplished automatically under commands from control circuitry carried on a circuit board 16, and connected to the data reader 10 via a flexible cable 17. Positioning of the data reader 10 ensues in a known manner either under the control of a program, or under manual control.

Figure 2:
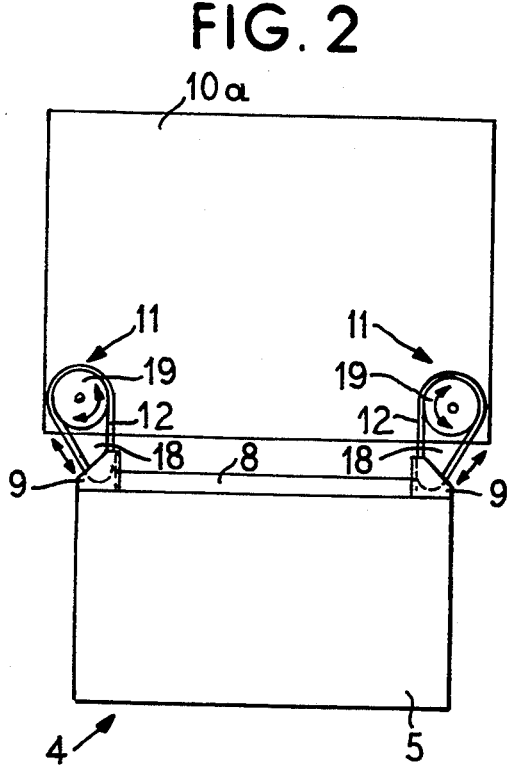
FIGS. 2 and 3 are schematic end elevational views of portions of the internal components of the loader shown in FIG. 1, showing engagement and disengagement of the data carrier transfer/drawer engaging assemblies with the magazine drawer.
Figure 3:
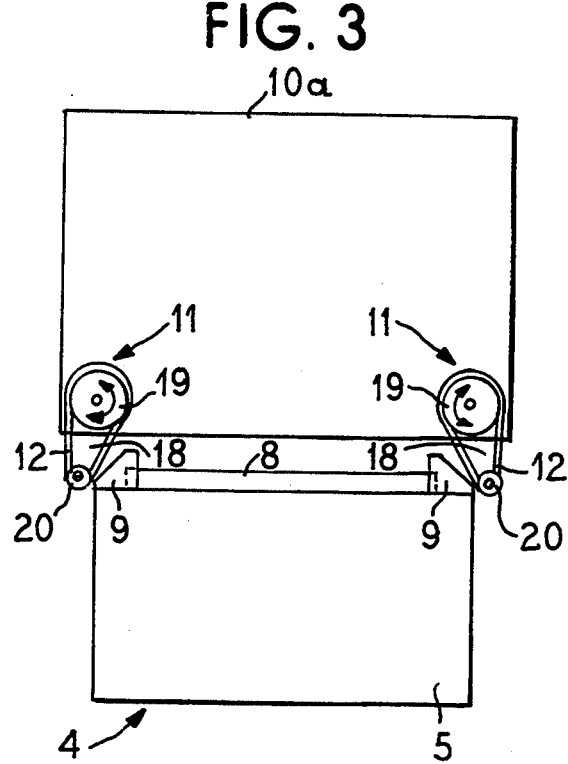

When the data reader 10 is positioned above a selected carrier 8, the data carrier 8 must be lifted from the magazine 7 into the data reader 10. This is accomplished by data carrier transfer/drawer engaging assemblies 11, mounted on opposite sides of the data reader 10, which also serve the purpose, as described below, of engaging the drawer assembly 4. Each assembly 11 has a rubber belt 12 thereon which, as can be seen in FIGS. 2, 3, 6 and 7, is entrained around two rotatable wheels 19 and 20, mounted on an assembly plate 18. For lifting a data carrier 8 out of the magazine 7 disposed in the drawer body 5, the assemblies 11 are rotated toward the sides of the data carrier 8 by a suitable mechanism, one embodiment of which is shown in FIG. 6 and will be described below. When the rubber belts 18 come into contact with the sides of the data carrier 8, the wheel 19 is caused to be rotated in a direction so that the now-vertical portions of the belts 12 are moving upwardly, thereby lifting the carrier 8 out of the magazine 7 and carrying it into the data reader 10. As shown in FIGS. 2, 3 and 6, the assemblies 11 are mounted on a support plate 10a, which is a part of the data reader 10. The wheels 19 can be rotated in any suitable manner, such as by a small motor carried beneath or inside the wheel 19, or by suitable gearing from a separate motor. The operation of the motor of which rotates the wheel 19 at the appropriate time is undertaken by a command from the circuit board 16 via a suitable signal line (not shown).

As shown in FIGS. 2 and 3, the assemblies 11 are also used to engage the drawer assembly 4, thereby permitting the drawer assembly 4 to be pulled into and pushed out of the loader 1 by the same motor 14 which is used to move the data reader 10. A separate motor and driving linkage exclusively dedicated for moving the drawer assembly 4 is thus avoided.

As shown in FIGS. 1, 2 and 3, the drawer assembly 4 carries a pair of engagement elements 9 at a rear thereof, mounted on the drawer body 5. One such engagement element 9 is shown enlarged in FIG. 8, wherein it can be seen that the engagement element 9 is formed by a block 31 with an inclined surface 32 having a recess 33 therein.

As shown in FIG. 2, each assembly 11 is movable so that the end thereof at which the wheel 20 is disposed is received into the recess 33 in the engagement element 9, thereby creating a positive mechanical linkage from the drawer assembly 4 to the motor 14 via the guide elements 9, the assemblies 11, the data reader 10 and the belt 13. The motor 14 is then operated to move the drawer assembly 4 into or out of the housing 2, depending upon whether the loader 1 is at a beginning or an end of its operating command sequence. If the drawer assembly 4 is being moved into the housing 2, in which case one or more data carriers 8 will thereafter be removed from the magazine 7 and inserted in the data reader 10, the assemblies 11 are disengaged from the engagement elements 9, as shown in FIG. 3, so that the data reader 10 is free to move along the data carriers 8 in the magazine so as to be positionable over a selected one of those data carriers 8.

After the last data carrier 8 from which data has been read is replaced into the magazine 7 by the assemblies 11, the data reader 10 is again moved to a position above the engagement elements 9 and the assemblies 11 reengage the engagement elements 9 so that the drawer assembly 4 is pushed out of the housing 2. Since the engagement elements 9 are disposed at the rear of the drawer assembly 4, the drawer assembly 4 can be partially moved out of the housing 2 a sufficient distance by moving the data reader 10 to its extreme position at the right of FIG. 1. At this position, enough of the drawer assembly 4 is outside of the housing 2 so that the magazine 7 can be removed from the drawer body 5 and, if desired, a new magazine 7 can be inserted therein. The assemblies 11 remain engaged with the engagement elements 9, so that when it is desired to again move the drawer assembly 4 into the loader 1, these components will already be engaged.

Figure 4:
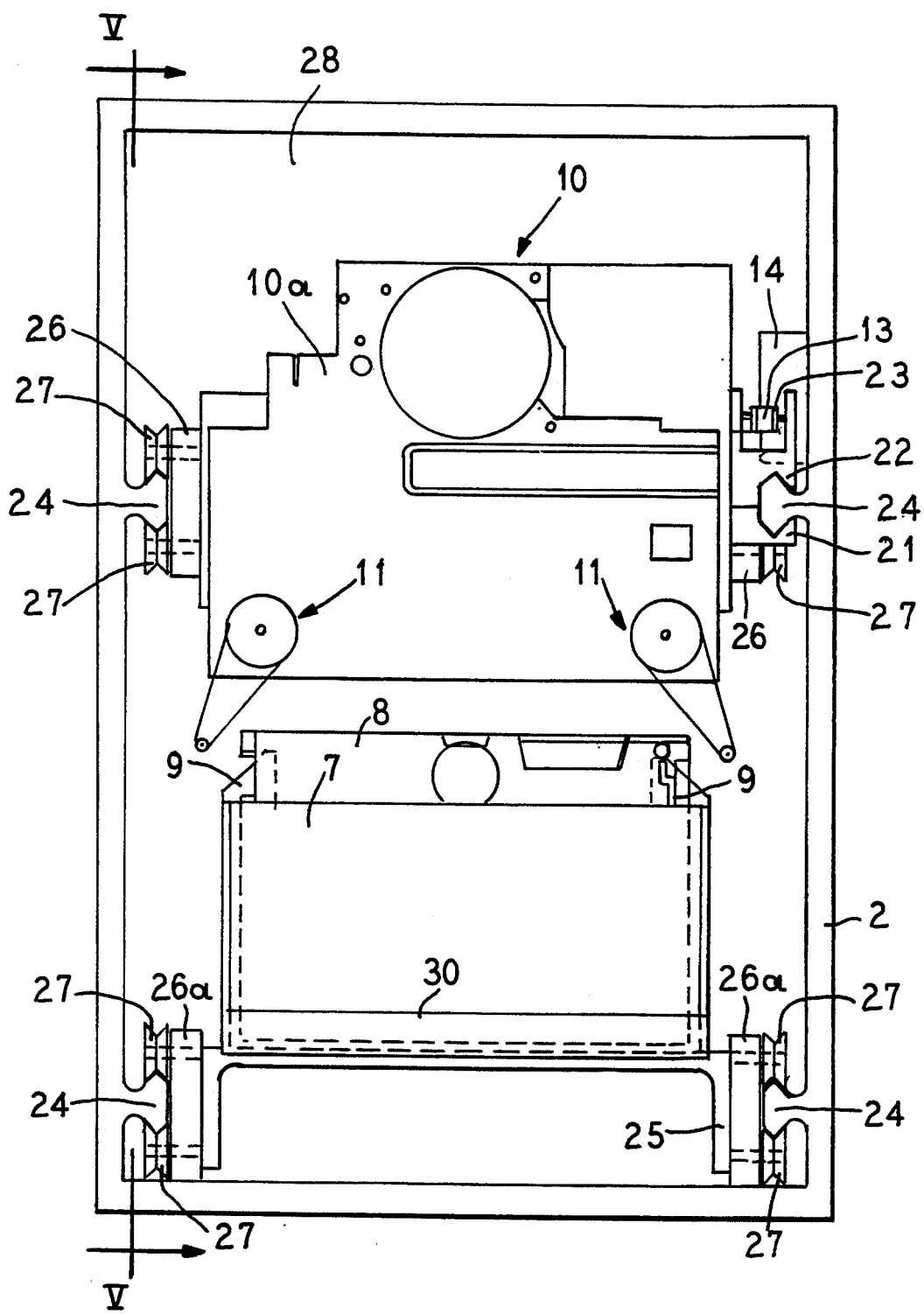
FIG. 4 is an end elevational view of a data carrier loader constructed in accordance with the principles of the present invention, with the front of the loader removed, showing the internal components in more detail.

As noted above, FIGS. 1, 2 and 3 are intended to be schematic representations for explaining the basic operation of the loader disclosed herein. Detailed views of an exemplary embodiment of such a loader as shown in FIGS. 4 and 5. As can be seen in FIG. 4, which is an elevational view as seen from the front of the loader, with its front panel 29 removed, the housing 2 is a seamless rectangular tube formed by extrusions, and is closed at its back by the rear panel 28. As part of the extrusion of the housing 2, a plurality of glide rails 24 are also extruded so that they are integrally formed as a part of the housing 2. These glide rails 24 provide tracks along which the drawer assembly 4 and the data reader 10 are moved. The drawer assembly 4 has a base support 25 which extends between opposed pairs of roller assemblies which ride on the glide rails 24. As can be seen in FIG. 5, there are three such roller assemblies for the drawer assembly 4, two of which are formed by respective blocks 26, each of which carries rollers 27 on axles, which engage opposite sides of each lower glide rail 24. The drawer assembly 4 also has a further block 26a which carries a pair of rollers 27 disposed on opposite sides of the lower glide rail 24. Since the view in FIG. 4 is from the front of the unit, only this block 26a can be seen in that view, with the blocks 26 being disposed behind the block 26a.

Identical blocks 26 with wheels 27 are attached to the data reader 10 on opposite sides thereof, and respectively engage the upper glide rails 24. As can be seen at the right of FIG. 4, a turning assembly for the belt 13 is disposed at a front of the right, upper glide rail 24. This assembly is formed by a lower element 21 and an upper element 22 which are clamped, such as by screwing or bolting, on opposite sides of the glide rail 24. The upper element 22 has flanges which support a turning roller 23 therebetween on an axle, about which the belt 13 is entrained. The motor 14, disposed at the rear of the housing 2, can be seen behind this assembly. The lower run of the belt 13 is clamped between a clamping element 29, shown in FIG. 5, and an upper surface of the block 26, so that the data carrier 10 moves with this lower portion of the belt 13 as the motor 14 is operated.

The particular manner and structure for rotating the assemblies 11 does not form a part of the present invention, however, an exemplary embodiment for accomplishing such rotation is shown in FIG. 6. As can be seen in FIG. 6, a linkage 34 is formed by a one-piece element having a central portion pivotable around an axle 35 and having a projection 36 thereon and having two arms 37 extending therefrom. The projection 36 can be moved to the left and right by any suitable motor-driven mechanism contained in the data reader. Each arm 37 of the linkage 34 is pivotably connected to a plate 38 at an axle 39. The plates 38 respectively extend above the assemblies 11, and are pivotable around the same axle about which the wheel 19 rotates, and are also connected to the axle about which the wheel 20 rotates. Each arm 37 has an articulation 40 therein. In the embodiment of FIG. 6, the articulations 40 are formed by regions of reduced width in the arms 37 (the arms 37 consisting of suitably flexible material, such as plastic), however, the articulations 40 could be formed as well by axles similar to axles 39. When the projection 36 is caused, for example, to move toward the left in FIG. 6, the arm 37 at the right of the axle 35 will also move toward the left, but the arm 37 at the left of the axle 35 will move toward the right, thereby causing the plates 38 to pivot around the respective axles of the wheels 19, causing the assemblies 11 to move away from the data carrier 8 (or, if the data reader 10 is positioned over the engagement elements 9, the assemblies 11 will be caused to move away from the engagement elements 9). Moving the projection 36 in the opposite direction causes the arms 37 to respectively move in the opposite directions as well, thereby bringing the assemblies 11 into engagement with the data carrier 8 (or the engagement elements 9).

Although modifications and changes may be suggested by those skilled in the art, it is the intention of the inventors to embody within the patent warranted hereon all changes and modifications as reasonably and properly come within the scope of their contribution to the art.

We claim as our invention:

1. A data carrier loader comprising:
   a housing;
   a drawer slidable into and out of said housing in a longitudinal direction and having a region adapted to removably hold a plurality of data carriers;
   a data reader for interacting with data carried by said data carriers movably supported in said housing above said drawer when said drawer is in said housing;
   reader positioning drive means for moving said data reader over said drawer in said housing to a selected location along said longitudinal direction;
   an engagement assembly mounted at a rear of said drawer; and
   transfer means carried by said data reader for transferring a data carrier between said drawer and said data reader and for engaging said engagement assembly for, when engaged with said engagement assembly, sliding said drawer into and out of said housing using said reader positioning drive means by moving said drawer together with said data reader.

2. A data carrier loader as claimed in claim 1 wherein said transfer means comprises two transfer assemblies respectively mounted at opposite sides of said data reader above opposite sides of said drawer.

3. A data carrier loader as claimed in claim 2 wherein each transfer assembly comprises:
- a transfer assembly plate, first and second wheels each mounted for rotation on said transfer assembly plate;
- a belt entrained around said wheels; and
- means for rotating one of said wheels for moving said belt.

4. A data carrier loader as claimed in claim 2 wherein each of said transfer assemblies has a free end, and wherein said engagement assembly means comprises two engagement elements respectively mounted at opposite sides of said drawer, each engagement element having an opening therein adapted to receive the free end of one of said transfer assemblies.

5. A data carrier loader as claimed in claim 1 wherein said housing comprises a front panel, a rear panel, and a single seamless tube forming sides, a top and a bottom of said loader and attached to said front end rear panels.

6. A data carrier loader as claimed in claim 5 wherein said single seamless tube has upper and lower glide rails extending into the interior of said housing and extruded as part of said tube, and wherein said data reader has a pair of roller assemblies respectively engaging said upper glide rails and wherein said drawer has at least a pair of roller assemblies engaging said lower glide rails.

7. A data carrier loader comprising:
- a housing having a portion formed by a single seamless tube having a pair of upper guide rails and a pair of lower guide rails integrally formed as part of said tube, said glide rails extending in a longitudinal direction of said housing;
- a drawer having at least one pair of roller assemblies disposed at opposite sides of said drawer and respectively engaging said lower glide rails so that said drawer is slidable into and out of said housing in said longitudinal direction, said drawer having a region adapted to removably hold a plurality of data carriers;
- a data reader for interacting with data carried by said data carriers and having a pair of roller assemblies respectively engaging said upper glide rails so that said data reader is movable in said housing in said longitudinal direction above said drawer,
- reader positioning drive means for moving said data reader along said upper rails over said drawer in said housing to a selected location above said drawer;
- transfer means carried by said data reader for transferring a data carrier between said drawer and said data reader and for engaging said engagement assembly for, when engaged with said engagement assembly, sliding said drawer into and out of said housing using said reader positioning drive means by moving said drawer together with said data reader.

8. A data carrier loader as claimed in claim 7 wherein said transfer means comprises two transfer assemblies respectively mounted at opposite sides of said data reader above opposite sides of said drawer.

9. A data carrier loader as claimed in claim 8 wherein each transfer assembly comprises:
- a transfer assembly plate, first and second wheels each mounted for rotation on said transfer assembly plate;
- a belt entrained around said wheels; and
- means for rotating one of said wheels for moving said belt.

10. A data carrier loader as claimed in claim 8 wherein each of said transfer assemblies has a free end, and wherein said engagement assembly comprises two engagement elements respectively mounted at opposite sides of said drawer, each engagement element having an opening therein adapted to receive the free end of one of said transfer assemblies.

11. A data carrier loader as claimed in claim 7 further comprising a magazine for removably containing said plurality of data carriers, and wherein said region of said drawer is adapted to removably hold said magazine.

* * * * *